United States Patent [19]

Bauer et al.

[11] Patent Number: 4,586,636
[45] Date of Patent: May 6, 1986

[54] MOISTURE PROOF CONTAINER FOR MOISTURE CURABLE COMPOSITIONS AND APPARATUS FOR DISPENSING MOISTURE CURABLE COMPOSITIONS FROM A MOISTURE PROOF CONTAINER

[75] Inventors: Herbert Bauer, Lutry; Hans Waibel; Joachim Speisebecher, both of Oberursel, all of Fed. Rep. of Germany

[73] Assignee: USM Corporation, Flemington, N.J.

[21] Appl. No.: 775,938

[22] Filed: Sep. 11, 1985

Related U.S. Application Data

[63] Continuation of Ser. No. 521,275, Aug. 8, 1983, abandoned.

[30] Foreign Application Priority Data

Aug. 27, 1982 [GB] United Kingdom ............... 8224679

[51] Int. Cl.$^4$ .............................................. B67D 5/62
[52] U.S. Cl. .................... 222/146.5; 222/327
[58] Field of Search ............. 222/146.5, 146.2, 146.4, 222/146.3, 327, 386, 387; 219/388, 421, 521, 530, 403, 416

[56] References Cited

U.S. PATENT DOCUMENTS

| | | | |
|---|---|---|---|
| 2,665,823 | 1/1954 | Fossa | 222/146.5 X |
| 2,773,496 | 12/1956 | Czarnecki | 222/146.5 X |
| 3,204,832 | 9/1965 | Barber | 222/146.5 X |

FOREIGN PATENT DOCUMENTS 254522  7/1926  United Kingdom ................ 222/327

Primary Examiner—Stanley H. Tollberg
Attorney, Agent, or Firm—Thomas S. Szatkowski

[57] ABSTRACT

Apparatus for dispensing a moisture curable composition in a container having a body portion, a closure member for closing one end of the body portion having an outwardly projecting neck defining an outlet opening, and a closure piston at the other end of the body portion comprising a support for the closure member including an exit port for receiving the neck of the container and a moisture proof seal between the neck and the exit port. The support also includes a heater to melt the moisture curable composition which was forced from the container by pushing downwardly on the closure piston. A clamp clamps the body portion of the supported container in place on the support.

7 Claims, 3 Drawing Figures

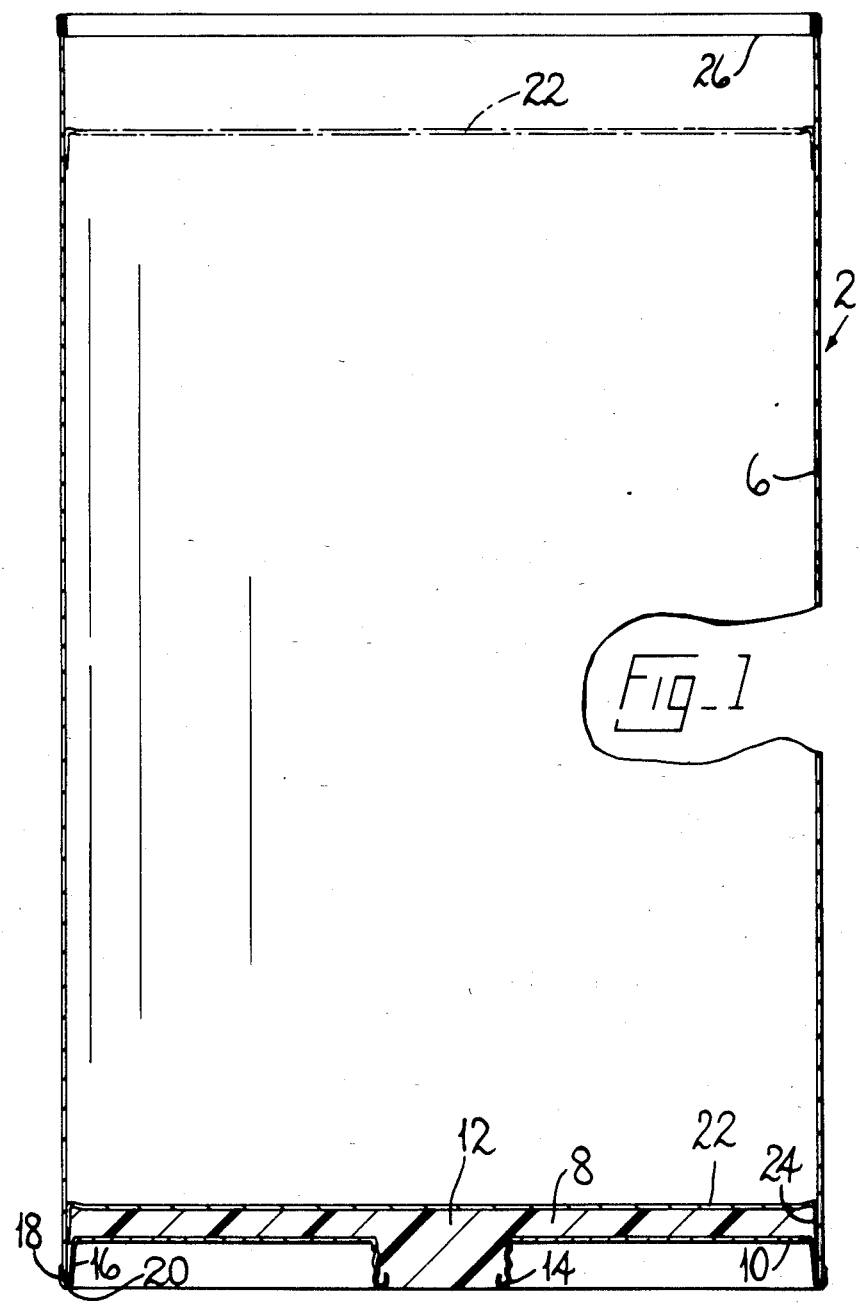

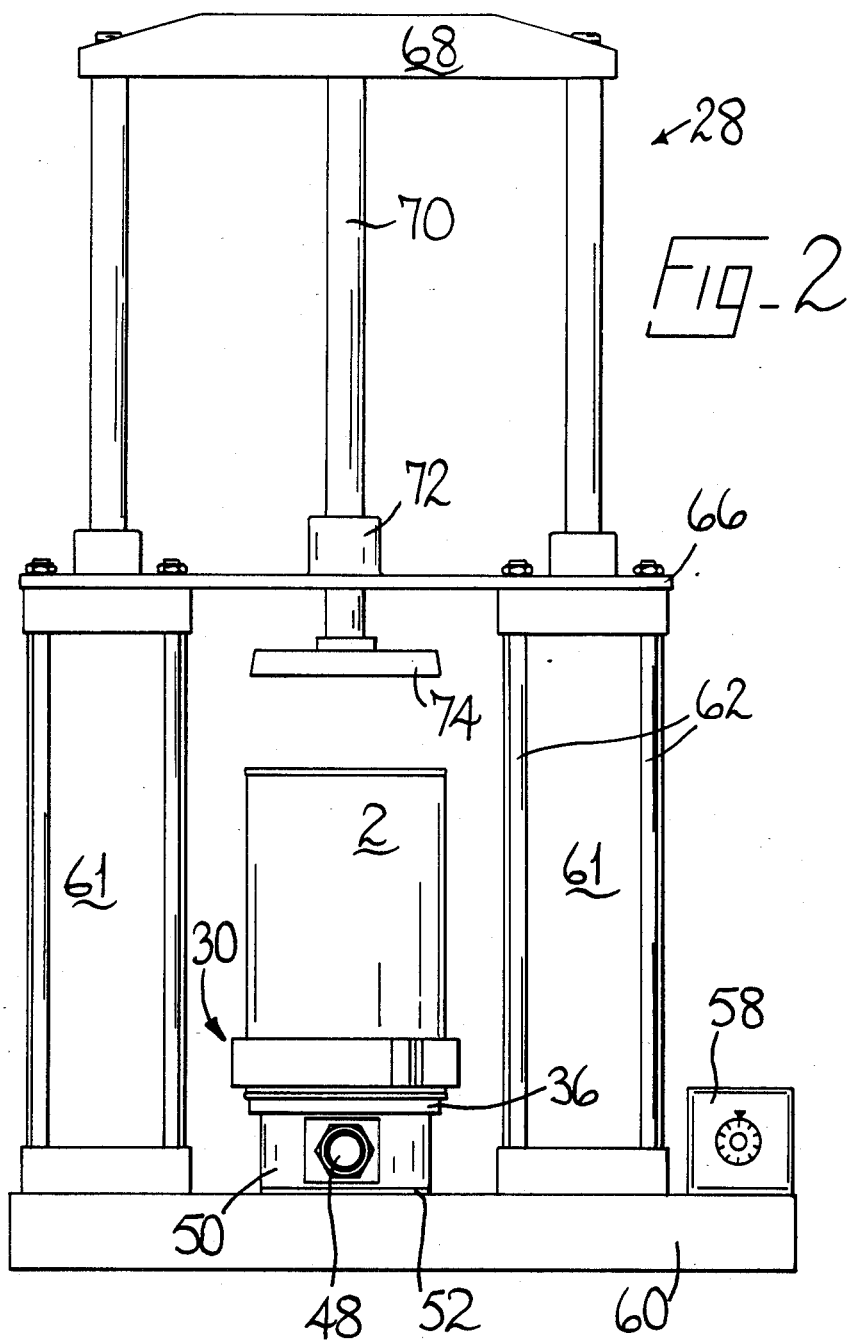

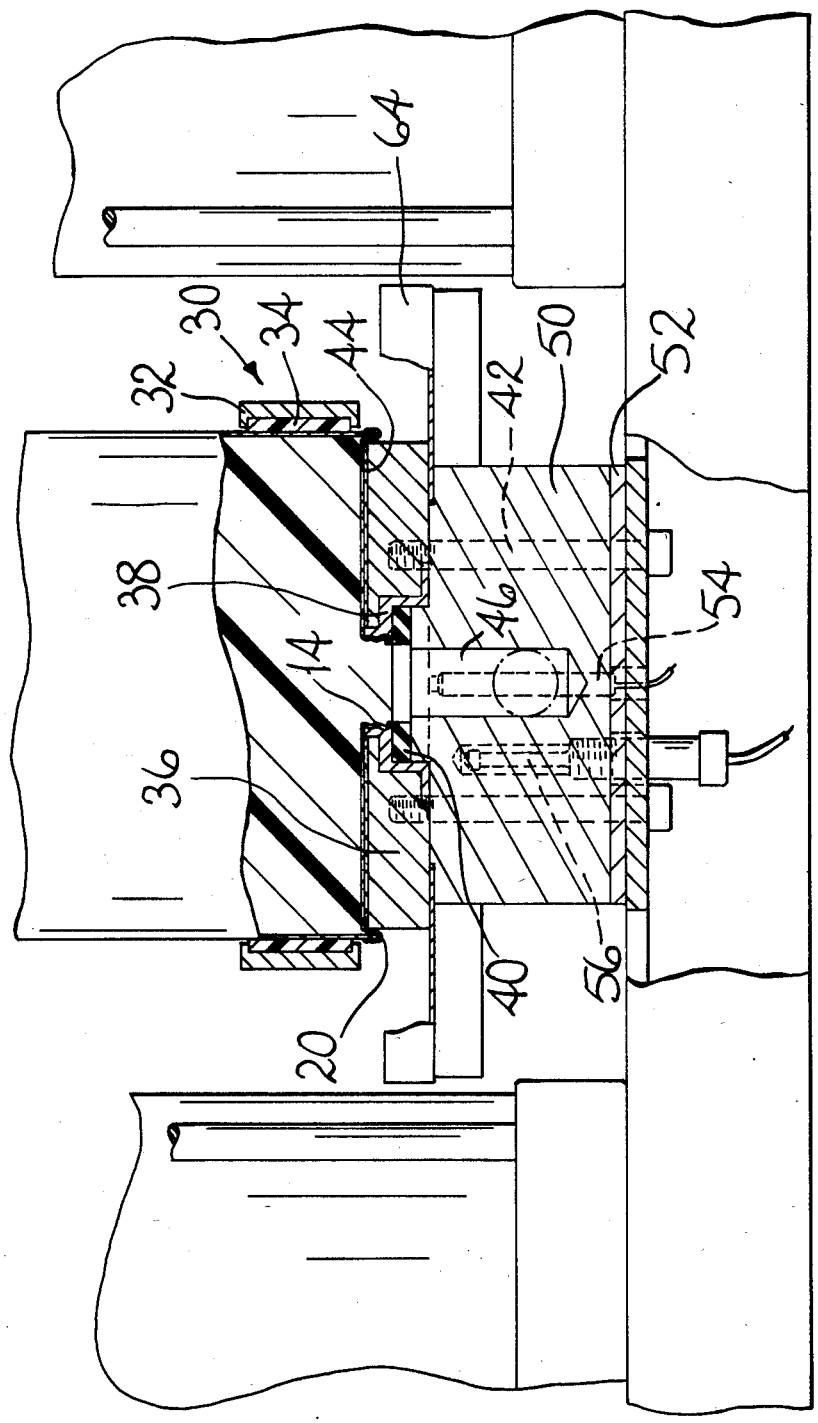

MOISTURE PROOF CONTAINER FOR MOISTURE CURABLE COMPOSITIONS AND APPARATUS FOR DISPENSING MOISTURE CURABLE COMPOSITIONS FROM A MOISTURE PROOF CONTAINER

This is a continuation of Ser. No. 06/521,275 filed Aug. 8, 1983, now abandoned.

BACKGROUND OF THE INVENTION

1. The Field of the Invention

This invention relates to moisture curable adhesives. More precisely this invention relates to means for storing and dispensing moisture curable adhesives without premature curing of the adhesive.

2. Description of the Prior Art

Various formulations for moisture curable compositions have been proposed. For example, adhesive compositions based on isocyanate terminated prepolymers have been proposed and their use in various bonding operations has also been proposed. U.K. patent specification No. 1540634 discloses inter alia the use of compositions based on certain prepolymers for bonding soles to shoes, including certain prepolymers derived from diphenyl methane diisocyanate and polyesters derived from an aliphatic dicarboxylic acid and an aliphatic diol. which are intended to be melted and supplied to the work in molten form. An adhesive composition of this kind is available from Bostik Limited under the names PA 5102 and Supergrip 2000 and is capable of use for attaching soles to shoes and various other bonding processes.

It will be apparent that moisture curable compositions are cured by reaction with moisture and it is therefore highly desirable to restrict and preferably avoid exposure of these compositions to moisture prior to use, so as to ensure a required uniformity of performance of the composition when used. It is therefore desirable to package and store the composition in a moisture proof package. It is equally important to provide for emptying of the package at the time of use to the maximum extent possible without premature cure of the composition and with minimum inconvenience to the operator even when the operator requires only a portion of the composition to be withdrawn from the package at any one time as may occur during intermittent use of the composition over a period of hours or even several days. We have found that these requirements cannot be met consistently by means of available packages and equipment. Among available equipment are various apparatuses intended to pump melted adhesive from a drum-like container via a hose connected with a piston of the apparatus which piston is adapted to be pressed into the drum to expel the melted adhesive. While this type of apparatus is generally suitable for use with many types of adhesive, we have found that when used with moisture curable adhesive, problems tend to result from seepage of the melted composition past the piston in the drum. This material hardens and adheres tenaciously to the drum and the piston and leads to not only waste of adhesive, but also difficulties in consistently preventing access of moisture of the atmosphere to adhesive in the drum. In turn this may lead to unpredictable performance of the apparatus and or adhesive during prolonged intermittent use of the apparatus to discharge adhesive from a single drum, and difficulties or inconveniences in removing the piston from the discharged drum when a fresh drum of adhesive comes to be used.

The supply of moisture curable adhesives in closed cartridges has been proposed, and may be satisfactory for small quantities of adhesive. Suitable cartridges are seamless and may be of extruded aluminum in which a tightly fitting piston may be used. However, it is desirable to provide for larger supplies of adhesive in order to permit suitable prolonged usage of a machine using the adhesive between changes from one used cartridge to another full one. Attempts to use available cans containing a piston having a peripheral skirt which trails from the piston as the piston is pushed to extrude adhesive have been unsuccessful, due to unwanted extrusion of adhesive between the skirt and the can wall.

The objects of the present invention are to provide an improved package for a meltable, moisture curable composition and to provide apparatus for dispensing the composition from the package.

SUMMARY OF THE INVENTION

We have now found that an improved usage of moisture curable adhesive can be achieved by use of a package containing solid adhesive and comprising a tubular body portion, a closure member sealingly secured to the body portion in such manner as to leave a narrow annular space between the closure member and the tubular body portion, and a closure piston having a rim projecting towards the closure member in sliding sealing engagement with the tubular body portion and adapted to be received in the annular space.

The invention provides in one of its aspects a package comprising a moisture proof container containing a solid composition which may be melted in the container by heating the container adjacent a closure member and dispensed as a liquid through an outlet opening of the closure member, the container comprising a tubular body portion one end of which is closed by the closure member, the closure member being sealingly secured to the body portion in such a manner as to leave a narrow annular space around the closure member between the closure member and the tubular body portion, and the container further comprising a closure piston at the opposite end of the body portion from the closure member the solid composition being disposed in the body portion between the piston and the closure member whereby liquid composition may be expelled through the outlet opening by movement of the piston towards the closure member the configuration of the piston corresponding substantially with that of the closure member and the piston having a rim projecting towards the closure member and in sliding sealing engagement with an inner wall of the body portion, the rim being received in the annular space between the body portion and the closure member as the piston approaches the closure member so that the container can be substantially completely emptied.

The invention provides in another of its aspects apparatus for dispensing a moisture curable composition provided in a package according to the invention, the apparatus comprising exit port means adapted to receive the outlet opening of the package, and means providing a moisture proof seal between the outlet opening and the exit port means, means for heating the closure member of the package, means for pressing the closure piston towards the outlet opening and means for conducting composition from the exit port to a dispenser nozzle without exposing the composition to atmosphere.

The invention provides in another of its aspects a method of dispensing an adhesive composition from a package according to the invention comprising introducing the package to apparatus according to the invention with its outlet opening received in the exit port means in moisture proof manner, its closure member in heat conductive contact with the platen and its closure piston presented to the means of the apparatus for pressing the closure piston towards the outlet opening, heating of the platen to an extent sufficient to cause melting of composition in the package adjacent the closure member, and causing operation of the means for pressing the closure piston towards the outlet whereby to urge the closure piston and unmelted composition towards the closure member and bring about flow of melted composition from the exit port means of the apparatus.

In order that the invention may be more fully appreciated there now follows a detailed description to be read with the accompanying drawings of the illustrative package and apparatus for dispensing a solid composition provided by the invention and illustrative thereof. It is to be understood that the illustrative package and illustrative apparatus have been selected for description to illustrate the invention by way of example only.

DESCRIPTION OF THE DRAWINGS

FIG. 1 is a cross-sectional view through the illustrative package.

FIG. 2 is a side view of the illustrative apparatus for dispensing a solid composition showing the illustrative package located in the apparatus.

FIG. 3 is a cross-sectional view of a portion of the apparatus and package shown in FIG. 2.

DESCRIPTION OF THE PREFERRED EMBODIMENTS

In a preferred package provided by the invention and illustrative thereof which is hereinafter more fully described and referred to as the illustrative package, an interior surface of the container is substantially cylindrical and free of obstruction as a result of formation of the tubular body portion from a single sheet of metal whose edges are joined by an interlock arrangement disposed at the exterior of the tubular portion. The outlet opening of the closure member is disposed at the center of the closure member and is provided with a threaded neck on which a threaded protective cap is secured. A plain closure is sealed to an end portion of the tubular body portion remote from the closure member. The closure piston is a significant element of the package, and serves not only as a piston to drive material through the package when required, but also as a sealing skirt forming a tight seal against the interior of the can.

The illustrative package is particularly suitable for containing solid adhesive composition which is to be melted for application to a workpiece and which requires to be protected from atmosphere during storage and use. The illustrative package is intended to contain a solid, meltable, moisture curable composition comprising a prepolymer derived from diphenyl methane diisocyanate and a polyester derived from an aliphatic dicarboxylic acid and an aliphatic diol, which is flowable when heated to about 100° C.

The illustrative package is intended for use in conjunction with dispensing apparatus comprising exit port means adapted to receive the outlet opening of the package, and means providing a moisture proof seal between the outlet opening and the exit port means, means for heating the closure member of the package, means for pressing the closure piston towards the outlet opening and means for conducting composition from the exit port to a dispenser nozzle without exposing the composition to atmosphere.

An example of a suitable apparatus provided by the invention and illustrative thereof which is hereinafter more fully described and referred to as the illustrative apparatus comprises a clamp means for supporting the tubular body portion of the container with the closure member seated against a platen of the apparatus and an exit port adapted to receive the outlet opening of the package.

The exit port extends through the platen and a rubber washer and also through an insert provided in the platen which insert is threaded to co-operated with a threaded neck disposed on the closure member of the package. The package may be heated by means of the platen to a suitable temperature, the platen being secured to a heating block. The exit port communicates with an outlet passageway formed in the heating block, the rubber washer being compressed between the platen and heating block to effect a moisture proof seal. The outlet passageway terminates at means for attachment of an electrically heated hose for conducting composition from the outlet passageway to a dispenser without exposing the composition to atmosphere. The closure piston is pressed towards the outlet opening by means of a piston element operable by piston and cylinder devices and arranged for movement towards and away from the platen to an extent sufficient to permit entry of the piston element to the package seated on the platen and to permit the container to be substantially completely emptied by means of a vertical downward movement of the piston. The piston and cylinder devices are pneumatically operated under the control of a pneumatic valve which in the illustrative apparatus is manually controlled by the operator of the apparatus but which may be operated by any convenient means e.g. a pedal switch or automatic or semi-automatic means associated with other equipment operating in sequence with the subject apparatus.

A method by which the illustrative package is emptied by means of the illustrative apparatus comprises introducing the package to the apparatus such that its outlet opening is received in the exit port means in moisture proof manner, its closure member being in heat conductive contact with the platen and its closure piston being presented to the piston element. The platen is heated to an extent sufficient to cause melting of the composition in the package adjacent the closure member and the means for pressing the closure piston towards the outlet opening is caused to operate whereby the closure piston and unmelted composition is urged towards the closure member and flow of melted composition is brought about from the exit port means of the apparatus.

As shown in FIG. 1, the illustrative package (2) comprises a moisture proof container containing a solid composition (8) which may be melted in the container and dispensed as a liquid through an outlet opening (12) in said container. The package (2) comprises a moisture proof container comprising a tubular body portion (6) formed from a single sheet of metal whose edges are joined by an interlock arrangement disposed outwardly of the container so as to provide a smooth cylindrical interior to the body portion. The body portion is closed at one end by a closure member (10) and comprises at the opposite end a closure piston (22). The closure member (10) comprises a flat disc with a central outlet opening (12) to which is secured a raised circular threaded neck (14). A screw cap (not shown) is affixed to the neck to provide a moisture proof seal. A circumferential portion of the closure member provides a raised skirt (16) with a lip (18), the lip being shaped to receive the wall of the tubular body portion and forming a moisture proof seal with said wall, thus forming an external rim (20). The skirt (16) of the closure member is inclined at an angle to the inner wall of the tubular body portion so as to leave a narrow annular space around the closure member between the closure member and the tubular body portion.

The closure piston (22) has a rim (24) which projects towards the closure member (10), the rim (24) being in sliding sealing engagement with an inner wall of the body portion. The container is sealed by means of a plain closure (26) secured to an end portion of the body portion which may be unsealed when the package is ready for use by means of a can opener.

Solid composition for example Bostik PA 5102 is provided within the container by filling the container with the composition in molten form. The package is filled with molten composition with the plain closure (26) at the base. The closure member (10) is then sealed into position and the container is inverted to allow any air bubbles to rise to the interface between the composition and the closure piston.

When it is desired to use the package to provide a supply of liquid composition, the plain closure is removed and the package is preferably placed with its closure member (10) at its base. In use, heat may be supplied to the package to create a melt zone in the region of the closure member. The composition is dispensed through the outlet opening (12) on the application of pressure to the closure piston to urge it towards the closure member. The configuration of the closure piston corresponds substantially with that of the closure member so that as the closure piston approaches the closure member, the rim of the closure piston is received in the annular space between the body portion and the closure member, and the container can be substantially completely emptied. In those cases where the slug of composition is smaller than the tubular body portion as a result of contraction on cooling of the composition after filling into the package as a melt, the rim (24) of the closure piston is guided down the inner wall of the tubular body portion by the gap between the composition and the inner wall of the body portion. The rim of the closure piston scavenges any composition adhering to the inner wall of the body portion and also serves as a seal to restrict flow of melted composition between the piston and the body portion.

The illustrative apparatus (28) is intended to be used to dispense the composition from the aforementioned package.

In the drawings (FIGS. 2 and 3) the package (2) is shown supported in the apparatus (28) by means of a clamp (30) enclosing the tubular body portion and located just above the external rim portion (20) of the closure member. The clamp comprises a metal outer portion (32) (FIG. 3) and a PTFE inner portion (34) in contact with the outer surface of the tubular portion (6). The package is mounted on a heated platen (36) comprising an aluminum disk which provides an exit port means adapted to receive the neck (14) of the package. A stepped replaceable threaded steel insert (38) is located in a counterbored passageway at the center of the platen of the same configuration as the counterbore. The threaded insert (38) receives the threaded neck (14) of the outlet opening (12) and provides a positive locking of the can onto the heated platen. Inserts (38) with different thread arrangements may be used to allow for attachment of cans with different neck threads. The heated platen also comprises four threaded recesses to accommodate four locating bolts (42). The diameter of the heated platen is slightly less than that of the tubular body portion (6) which allows the rim portion (20) of the package to rest over the shoulder of the heated platen. A release paper (44) is inserted between the heated platen (36) and the closure member (10) of the container to prevent spillage of the composition from bonding the two members together.

Means for heating the closure member of the package is provided by a heating block (50) positioned underneath the heated platen (36). The two elements are secured together by means of four locating bolts (42). Inserted into an annular recess provided by the steel insert (38) is a rubber washer (40) which provides a moisture proof seal between the exit port and an outlet passageway (46) formed in the heating block. The heating block comprises a solid aluminum block with drillings to receive heating elements and a thermocouple (56). The block is heated by means of the heating elements viz. three cartridge heaters (54) vertically positioned in a triangular arrangement. The temperature of the heating block is controlled by means of the thermocouple (56) inserted vertically into the block which itself is controlled by the dial at (58). A spillage tray (64) (shown only on FIG. 3) is located between the heated platen (36) and the heating block (50).

An outlet passageway (46) is formed in the heating block for conducting liquid composition from the outlet opening (12). The outlet passageway comprises a vertical section and a horizontal section (shown in cross-section) intersecting said vertical section at right angles. The outlet passageway terminates in a threaded orifice (48) which provides a means for attachment of an electrically heated hose for conducting the composition from the outlet passageway to a dispenser nozzle (not shown) without exposing the composition to atmosphere. The dispenser nozzle has a valve means for controlling flow of the composition from said dispenser nozzle.

The heating block is seated on a heat insulating element (52) and secured to a frame (60) of the apparatus by the locating bolts (42). Cylinders (61) of two similar piston and cylinder devices are secured to the frame at either side of the heating block by means of bolts (62) positioned in a square arrangement around each cylinder. Upper end portions of the cylinders are secured together by a plate (66). Upper end portions of pistons of the piston and cylinder devices are secured to a crosshead (68). A piston rod (70) is secured to the crosshead (68) and extends through a bearing (72) located on the plate (66). A piston (74) is secured to the piston rod (70) and is thus arranged for movement heightwise of the platen and is arranged to enter the tubular body portion of a can located on the platen. The piston and cylinder devices are pneumatically operated under control of an operator controlled pneumatic valve.

The apparatus is enclosed in a grid (not shown) for safety precautions and is provided with a safety catch which prevents operation of the apparatus whilst the metal grid is not in position.

When using the illustrative package and the illustrative apparatus to dispense composition from the package, the plain closure (26) is removed from the package by means of a can opener. The illustrative package is located in the illustrative apparatus as shown in FIG. 2. The closure member of the illustrative package is positioned on the heated platen (36) of the illustrative apparatus and the two elements are secured together by means of the screw threaded arrangement between the threaded neck and the steel insert of the exit port. The clamp (30) is fastened around the body portion to secure the package in position. The heated platen (36) is heated by means of a heating cartridges (54) in the heating block, which are controlled by the heating control (58), which creates a melt zone in the solid composition adjacent to the closure member (10). The liquid composition is dispensed from the outlet opening (12) of the package when the closure piston (22) is urged towards the closure member by means of pneumatic pressure on the piston and cylinder devices.

The composition flows from the outlet opening (12) through the outlet passageway (46) and into the hose connected to the threaded orifice (48) of the outlet passageway. The hose is attached to an applicator device by which means the composition is applied to a workpiece. The supply of composition from the applicator device is controlled by means of a valve control which when closed prevents flow of composition from the applicator device. When the valve is in the open position the apparatus will continue to dispense the composition onto the workpiece until the can is substantially completely emptied. The package is removed from the apparatus by raising the piston vertically, unlocking the clamp (30) and unscrewing the neck (14) of the closure member from the steel insert (38).

We claim:

1. A package comprising a moisture proof container for containing a solid moisture curable composition which is to be melted and dispensed as a liquid therefrom comprising
    a tubular body poriton,
    a closure member for closing one end of said tubular body portion, said closure member being sealingly secured to the body portion in such a manner as to leave a narrow annular space around the closure member between the closure member and the tubular body portion, and adapted to be heated to melt solid moisture curable composition adjacent thereto for discharge through an opening in said closure member,
    a closure piston at the opposite end of said tubular body portion, said closure piston having a rim projecting towards the closure member and in sliding sealing engagement with an inner wall of the body portion, the rim being received in the annular space between the body portion and the closure member as the piston approaches the closure member so that the container can be substantially completely emptied, and
    a moisture curable composition within said container comprising a prepolymer derived from diphenyl methane diisocyanate and a polyester derived from an aliphatic dicarboxylic acid and an aliphatic diol contained within said package.

2. Apparatus for dispensing a moisture curable composition in a container having a body portion, a closure member for closing one end of the body portion having an outwardly projecting neck defining an outlet opening, and a closure piston having a configuration corresponding substantially with that of the closure member at the other end of the body portion comprising
    means for supporting the closure member including
        exit port means for receiving the neck of the container, and
        means for providing a moisture proof seal between the neck and said exit port means,
    means for heating the closure member of the container to melt the moisture curable composition,
    clamp means for clamping the body portion of the supported container, and
    means for pressing the closure piston towards the closure member.

3. Apparatus for dispensing a moisture curable composition according to claim 2 wherein said supporting means further comprises a platen having a central hole therein for receiving said exit port means and said means for providing a moisture proof seal between the neck and said exit port means comprises a rubber washer.

4. Apparatus for dispensing a moisture curable composition according to claim 3 wherein the neck of the closure member has an external thread and said exit port means comprises an insert having an internal threaded hole for threadedly engaging with the threaded neck of the closure member of the container.

5. Apparatus for dispensing a moisture curable composition according to claim 3 wherein said platen is made of a heat conducting material and said heating means comprising
    heating block means, and
    means for securing said heating block means to said platen whereby the closure member of the container may be heated.

6. Apparatus for dispensing a moisture curable composition according to claim 5 wherein an outlet passageway is defined in said heating block means communicating with said exit port means, said securing means further comprising means for compressing said rubber washer between said platen and said heating block means.

7. Apparatus for dispensing a moisture curable composition according to claim 2 wherein said pressing means comprises a piston.

* * * * *